United States Patent [19]
Munson

[11] Patent Number: 5,369,617
[45] Date of Patent: Nov. 29, 1994

[54] HIGH SPEED MEMORY INTERFACE FOR VIDEO TELECONFERENCING APPLICATIONS

[75] Inventor: Bill A. Munson, Portland, Oreg.

[73] Assignee: Intel Corporation, Santa Clara, Calif.

[21] Appl. No.: 172,113

[22] Filed: Dec. 21, 1993

[51] Int. Cl.$^5$ .............................................. G11C 13/00
[52] U.S. Cl. .................... 365/219; 365/230.03
[58] Field of Search ............. 365/189.01, 189.04, 365/230.01, 230.03, 230.08, 219

[56] References Cited

U.S. PATENT DOCUMENTS

| | | | |
|---|---|---|---|
| 3,895,360 | 7/1975 | Cricchi et al. | 365/189.01 |
| 3,962,689 | 6/1976 | Brunson | 365/189.01 |
| 4,581,721 | 4/1986 | Gunawardana | 365/189.01 |
| 4,608,678 | 8/1986 | Threewitt | 365/189.01 |
| 4,633,441 | 12/1986 | Ishimoto | 365/189.01 |

*Primary Examiner*—Terrell W. Fears
*Attorney, Agent, or Firm*—Blakely, Sokoloff, Taylor & Zafman

[57] ABSTRACT

A high speed memory interface, contained within a video teleconferencing system, couples a capture first-in first-out (FIFO) device, a host FIFO, a PB FIFO, and a display FIFO to a high speed memory. The interface includes a high speed channel interface, including an arbiter, that allocates bandwidth for the high speed memory for a display service, a capture service, a host service and a refresh service. The capture FIFO receives raw capture video data, buffers the raw capture video data at a capture rate, and transfers the raw capture video data to the high speed memory. The host FIFO receives display video data from a remote source, buffers the display video data, and transfers the input display video data to the high speed memory. The PB FIFO reads capture video data and display video data, during the PB service, from the high speed memory to provide an input queue for video compression and video decompression. The display FIFO receives, during the display service, display video data from the high speed memory, and buffers the display video data to provide the display video data at a display rate for the host. The high speed memory interface has application for use in a computer system supporting video teleconferencing.

36 Claims, 6 Drawing Sheets

HIGH SPEED MEMORY INTERFACE FOR VIDEO TELECONFERENCING APPLICATIONS

FIELD OF THE INVENTION

The present invention relates to the field of telecommunications, and more particularly, to methods and apparatus for a high speed memory interface in a video teleconferencing system.

BACKGROUND OF THE INVENTION

Computer systems perform a variety of functions including data acquisition, data processing and display of graphical images. The ability to integrate different external sources under control of a central processing unit generates a variety of applications for computer systems. For example, computers find applications in video teleconferencing. In order to utilize a computer system for video teleconferencing, video data are captured at a remote source and at the host computer system. The captured video data are transmitted from a remote source to the computer system. The display monitor within the computer system provides a means to display video data. In addition, video data are transmitted from the remote source to the computer system for display in the remote source.

The capture and display of video data requires the handling of two high-bandwidth real time data streams. In order to attain the necessary memory bandwidth, current solutions require wide (32 bits) arrays of memories (DRAM or VRAM). In addition, the memory arrays are often organized in multiple interleaved banks. Current state of the art DRAMs may provide peak transfer rates of 100 Mbytes per second, and realistic aggregate data transfers on the order of 60–80 Mbytes per second for 32 bit non interleaved arrays. The video capture data rate for unscaled national television standard committee (NTSC) square pixel data is approximately 25 Mbytes per second during the active portion of a scan line. The video display data rate is dependent on the display supported, and for the VESA standard, 1024×768×8 bpp @70 Hz, the data rate is 75 Mbytes per second during the active portion of the scan line. In order to support the capture and display data streams in a 32 bit non interleaved DRAM array, extremely large FIFOs for both data streams are required. However, the large FIFOs can cause long latencies for other processors and operations that require access to the memory. In the absence of these large FIFOs, the size of the display supported and the amount of unscaled input video data is compromised.

Although utilizing 32 bit interleaved or 64 bit non-interleaved memory arrays increases the available memory bandwidth, it increases the total minimum memory size and the incremental memory size. In many cases, the incremental memory size, which is dependent on the selected memory device, is greater than the amount of memory required for the application. Generally, the memory cannot be used for any other purpose in the system thereby resulting in additional cost without additional benefit.

SUMMARY AND OBJECTS OF THE INVENTION

Therefore, it is an object of the present invention to provide a memory interface for video teleconferencing applications comprising a high bandwidth.

It is another object of the present invention to provide a memory interface for video teleconferencing applications comprising a high bandwidth without increasing the size of the memory.

It is a further object of the present invention to provide a memory interface for video teleconferencing applications requiring minimal hardware.

It is a further object of the present invention to provide a memory interface for video teleconferencing applications that permits incrementing the size of memory in small increments.

These and other objects of the present invention are realized in an arrangement that includes a computer system having a central processing unit (CPU), a memory, a bus and an output display. The computer system also includes a remote interface, coupled to the bus, for interfacing the computer system to a remote source, a graphics subsystem, a video teleconferencing subsystem and a chroma key circuit. The graphics subsystem generates graphics data, including an encoded key, for display on the output display. The video teleconferencing subsystem permits teleconferencing between the computer system, serving as the host, and at least one remote source by generating capture video data and receiving display video data. The display video data is processed, and output to the chroma key circuit. The chroma key circuit permits display of video and graphics on the output display.

The video teleconferencing subsystem contains a host interface, a capture unit, a display unit, an image processing unit and a high speed memory. In addition, the video teleconferencing subsystem contains a high speed memory interface for coupling the capture unit, the image processing unit, and the display unit to the high speed memory. The capture unit captures video data generated by a video source, such as a camera. The host interface receives display video data, generated by the remote source, and transmits the capture video data. The image processing unit compresses the capture data for transmission, and decompresses the display data for display by the display unit.

The high speed memory interface couples a capture first-in first-out (FIFO) device, a host FIFO, a PB FIFO, and a display FIFO to the high speed memory. The interface includes a high speed channel interface, including an arbiter, that allocates bandwidth for the high speed memory for a display service, a capture service, a host a service and a refresh service. The capture FIFO receives raw capture video data, and buffers the raw capture video data at a capture rate. The capture FIFO includes capture transfer logic that transfers the raw capture video data from the capture FIFO to the high speed memory during the capture service. The host FIFO, which includes host transfer logic, receives input display video data from the remote source, and buffers the input display video data. The host transfer logic transfers the input display video data from the host FIFO, during the host service, to the high speed memory. In addition, the host transfer logic transfers, from the high speed memory, capture video data, during the host service, to the host FIFO.

The PB FIFO contains PB transfer logic that transfers the capture video data, during the PB service, from the high speed memory to the PB FIFO to provide an input queue for video compression. The PB transfer logic also transfers the display video data, during the PB service, from the high speed memory to the PB FIFO to provide an input queue for video decompression. The display transfer logic transfers the display video data, during the display service, from the high speed memory to the display FIFO. The display FIFO buffers the display video data to provide the display video data at a display rate for the host.

Other objects, features and advantages of the present invention will be apparent from the accompanying drawings, and from the detailed description that follows below.

BRIEF DESCRIPTION OF THE DRAWINGS

The objects, features, and advantages of the present invention will be apparent from the following detailed description of the preferred embodiment of the invention with references to the following drawings.

DETAILED DESCRIPTION

Methods and apparatus for a high speed memory for a video teleconferencing system are disclosed. In the following description, for purposes of explanation, specific nomenclature is set forth to provide a thorough understanding of the present invention. However, it will be apparent to one skilled in the art that these specific details are not required to practice the present invention. In other instances, well known circuits and devices are shown in block diagram form to avoid obscuring the present invention unnecessarily.

Figure 1:
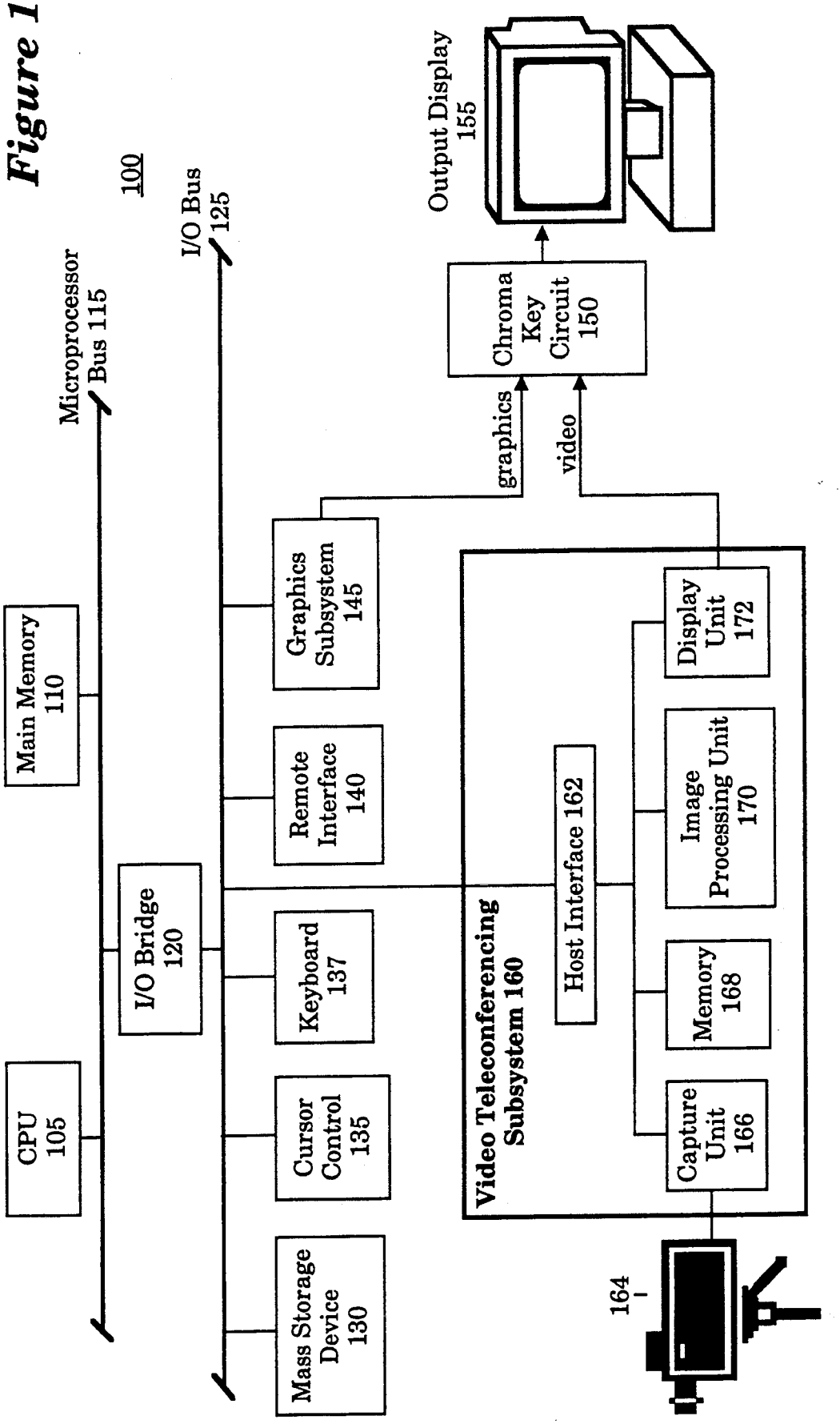
FIG. 1 illustrates a high level diagram of a computer system incorporating the video teleconferencing system of the present invention.

FIG. 1 illustrates a high level diagram of a computer system incorporating the video teleconferencing system of the present invention. A computer system 100 contains a central processing unit (CPU) 105 and main memory 110, coupled via a microprocessor bus 115. The computer system 100 also contains an input/output (I/O) bus 125. A mass storage device 130, cursor control device 135, and keyboard device 137, are coupled to the I/O bus 125. The mass storage device 130, cursor control device 135, and keyboard device 137, are those I/O devices typically found contained within a computer system, and these devices are intended to represent a broad category of I/O peripheral devices, which are well known in the art and will not be described further.

The microprocessor bus 115 is coupled to the I/O bus 125 via an I/O bridge 120. The I/O bridge 120 provides functionality to allow the CPU 105 to interface to the I/O devices contained on the I/O bus 125. In one embodiment, the I/O bridge 120 contains an I/O bus arbiter and an I/O bus controller. In a preferred embodiment of the present invention, the CPU 105 comprises an Intel ® architecture microprocessor. The CPU 105, main memory 110, microprocessor bus 115, I/O bridge 120, and I/O bus 125 are intended to represent a broad category of components typically contained within a data processing system, which are well known in the art, and will not be described further.

The video teleconferencing system of the present invention permits a host system, such as the computer system 100, to communicate with a remote source. The video teleconferencing system permits two way communication such that the remote source receives video and audio data generated from the host system, and the host system receives video and audio data generated from the remote source. In order to implement the video teleconferencing system of the present invention, the computer system 100 contains a video teleconferencing subsystem 160. The video teleconferencing subsystem 160 contains a capture unit 166, memory 168, an image processing unit 170, a display unit 172, and a host interface 162. A video camera 164 is coupled to the computer system 100 to record images for use in the video teleconferencing system. The video teleconferencing subsystem 160 communicates with the computer system 100 via the host interface 162. In part, the host interface 162 contains logic to permit the video teleconferencing subsystem 160 to operate as an agent on the I/O Bus 125. In general, the video images are processed in the video teleconferencing subsystem 160, and analog video signals are output to the chroma key circuit 150.

In order to implement the teleconferencing system of the present invention, the computer system 100 contains a remote interface 140, a graphics subsystem 145, and a chroma key circuit 150. In addition, the computer system 100 contains an output display 155 coupled to chroma key circuit 150. In general, the remote interface 140 provides an interface to the remote source. In one embodiment, the remote interface comprises an integrated services digital network (ISDN) interface that permits digital transmission of information via telephone lines. The host interface 162, contained within the video teleconferencing subsystem 160, operates in full duplex to permit transfer of data between the video teleconferencing 162 and the remote source via the remote interface 140. The graphics subsystem 145 contains hardware required to drive the output display 155. In one embodiment, the graphics subsystem 145 contains a frame buffer coupled to a random access memory and digital to analog converter (RAM DAC). The frame buffer may be implemented on a video random access memory (VRAM). The RAM DAC both converts pixel data to the appropriate format and generates analog graphics signals to drive the output display 155. In a preferred embodiment, the graphics subsystem 145 generates a red ($R_g$), green ($G_g$), and blue ($B_g$) analog graphics signals for input to the chroma key circuit 150.

The chroma key circuit 150 permits display of graphics data, generated by the computer system 100, and video data, generated by the video teleconferencing subsystem 160, on a single output display 155. In addition to receiving the RGB analog graphics signals from the graphics subsystem 145, the chroma key circuit 150 receives a $R_v$, $G_v$, and $B_v$ analog signals from the video teleconferencing subsystem 160. The chroma key circuit 150 selects either the $R_g$, $G_g$ and $B_g$ signals from the graphics subsystem 145 or the $R_v$, $G_v$, and $B_v$ signals from the video teleconferencing subsystem 160. The selection is based on the detection of a key encoded on the $R_g$, $G_g$ and $B_g$ signals. The chroma key circuit 150 generates a red out ($R_{out}$), green out ($G_{out}$) and blue out ($B_{out}$). The $R_{out}$, $G_{out}$ and $B_{out}$ signals drive the output display 155. One embodiment for the chroma key circuit 150 is described in U.S. patent application Ser. No. 08/154,955, by Freytag et al., entitled "Analog Chroma Keying on Color Data", and assigned to the assignee of the present invention, Intel ® Corporation.

The video teleconferencing system of the present invention requires encoding data, representing the key, on the $R_g$, $G_g$ and $B_g$ signals. For example, the encoding of the $R_g$, $G_g$ and $B_g$ signals may be accomplished via a program operating in conjunction with a windows program to designate areas of the output display for graphics and video. For the area of the output display screen designated for a video window, the program encodes data representing the key. For the areas of the output display screen designated for graphics, the program generates the appropriate pixel data. The key data, representing the video windows, and the pixel data, representing the graphics area, are stored in the frame buffer in the graphics subsystem 145 for subsequent retrieval and generation of the $R_g$, $G_g$ and $B_g$ signals.

The video teleconferencing subsystem 160 permits capturing of video input from the video camera 164. The video input is utilized to provide a video image for the remote source. In addition, a window is generated on the output display 155 so that the user of the video teleconferencing system of the present invention views the video image being transmitted to the remote source. In order to view a video image generated at the remote source, the video teleconferencing subsystem 160 receives video data. In the computer system 100, the video teleconferencing subsystem 160 communicates to the remote source via the remote interface 140. The video teleconferencing subsystem 160 subsequently displays the video received from the remote source on a video window on the output display 155. Consequently, the video teleconferencing subsystem 160 requires manipulation of two high speed data paths (i.e. capture of video input from the host, and display of video from the remote source and a monitor view window).

In order to capture the video input, the video camera 164 is coupled to the capture unit 166. In general, the capture unit 166 receives the video data, converts the video data to a format compatible for a particular application, and transfers the converted video data to the memory 168. In order to receive video data from the remote source, the video teleconferencing subsystem 160 receives video data, via the host interface 162, and stores the video data in the memory 168. The image processing unit 170 is also coupled to the memory 168. In general, the image processing unit 170 performs compression and decompression on video data. Compression of video data prior to transfer permits transmission at higher data rates and utilizes less bandwidth in the transmission medium. In order to execute the video compression, the image processing unit 170 reads raw video data from the memory 168. Upon completion of the data compression, the image processing unit 170 writes the compressed data to the memory 168.

In order to execute video decompression in the video teleconferencing subsystem 160, the image processing unit 170 reads compressed video data, transferred from the remote source, and decompresses the video data. The decompressed video data is then written to the memory 168. The display unit 172 is also coupled to the memory 168. In general, the display unit 172 generates video data for display on the output display 155. In order to process the video data for display, the display unit 172 reads decompressed video data from the memory 168. The display unit 172 processes the decompressed display video data for input to the chroma key circuit 150. In addition, the display unit 172 reads raw capture video data from the memory 168, processes the data, and inputs the data to the chroma key circuit 150.

Figure 2:
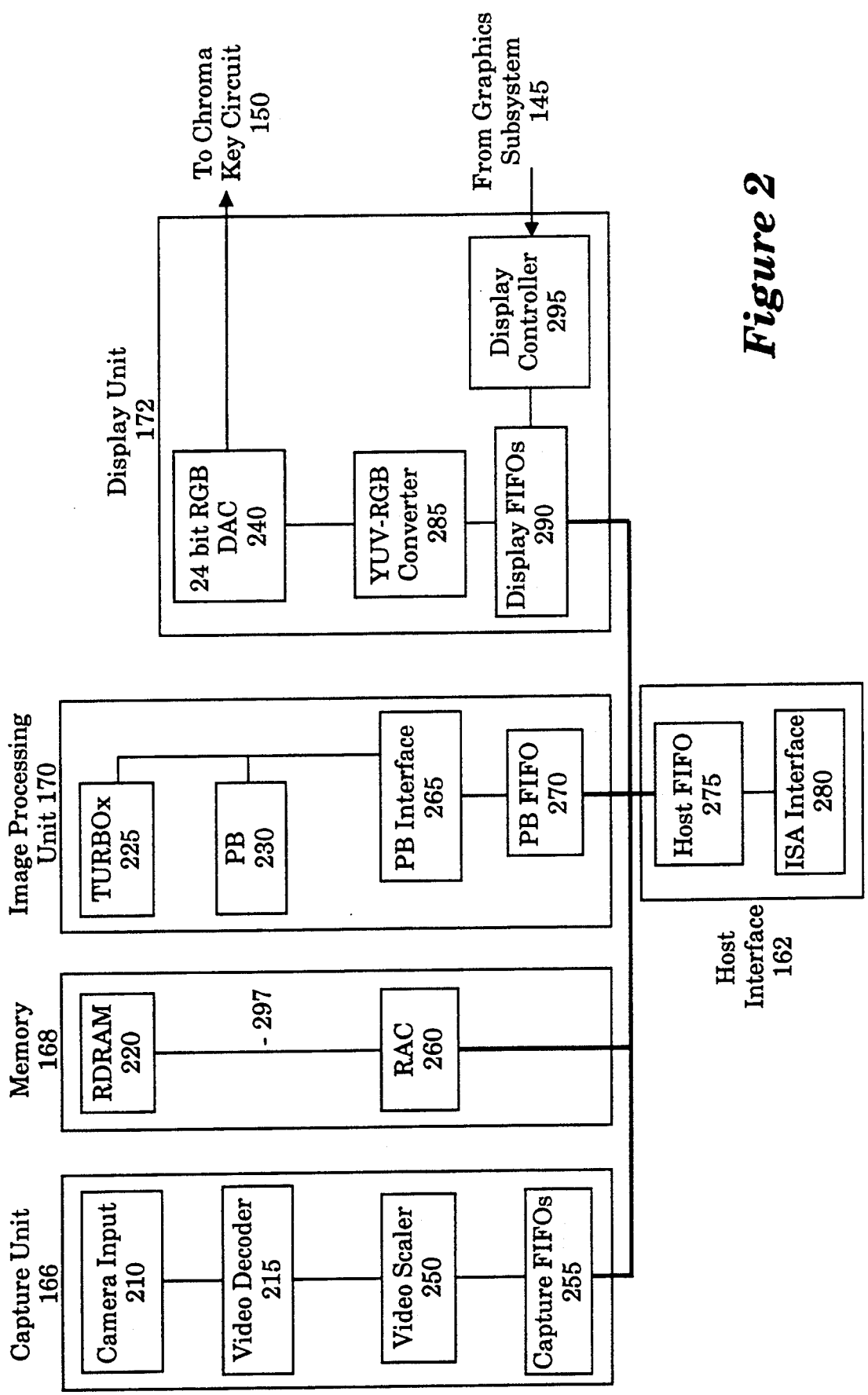
FIG. 2 illustrates one embodiment for the video teleconferencing subsystem of the present invention.

FIG. 2 illustrates one embodiment for the video teleconferencing subsystem of the present invention. The display unit 166 contains a camera input 210, video decoder 215, video scaler 250, and a capture first in first out (FIFO) memory 255. In operation, a video signal, generated by the video camera 164, is input to the camera input 210. The video camera 164 generates a composite base band video signal encoded as either a NTSC or PAL video signal. The composite base band video signal contains raw capture video data for the teleconferencing system. The raw capture video data input to the camera input 210 is arranged in a packed pixel format. The video decoder 215 receives the composite base band video signal, and decodes the video signal to generate digital video data. In a preferred embodiment, the decoder 215 generates CCIR 601 digital video data. The video decoder 215 contains an analog to digital (A/D) converter and a clock chip to provide timing for the CCIR 601 video data. The video decoder 215 is intended to represent a broad category of NTSC and PAL decoders, which are well known in the art and will not be described further.

The output of the video decoder 215 is input to the video scaler 250. In general, when enabled, the video scaler 250 reduces the size of the captured raw video data. For example, in the NTSC video system, the video decoder 215 supplies video data comprising 640 (square pixels) pixels per line and 485 lines per frame in two interlaced fields. Therefore, for the NTSC video data, each field contains 242.5 lines. In one application for the video teleconferencing subsystem 160, video data contains 160 pixels per line and 120 lines per field. Consequently, the video scaler 250 reduces the size of the video image for the particular application. In order to reduce the size of the video data, the video scaler 250 contains digital filters that filter the video data to convert a NTSC 640×241.5 video field to a 160×120 video field. The digital filters permit smooth conversion so that the reduced video image is not distorted. The output of the video scaler 250 is arranged in a packed pixel data format. The packed pixel data format consists of "$Y_0U_0$, $Y_1V_0$, $Y_2U_2$, and $Y_3V_2 \ldots$".

Figure 3:
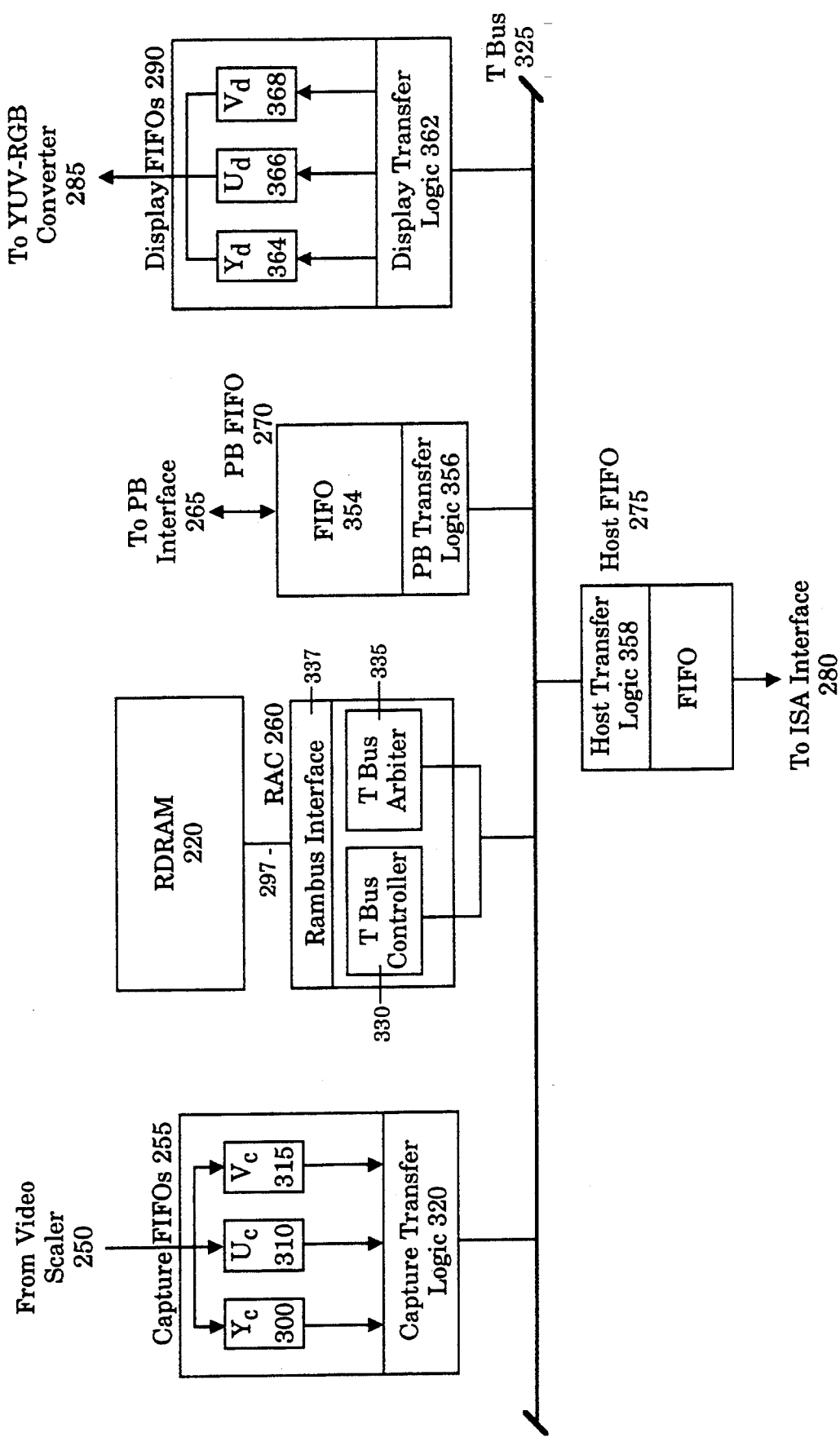
FIG. 3 illustrates one embodiment for a high speed memory interface configured in accordance with the present invention.

The output of the video scaler 250 is coupled to the input of the capture FIFOs 255. The capture FIFOs 255 contain a $Y_c$ FIFO 300, a $U_c$ FIFO 310, and a $V_c$ FIFO 315 (FIG. 3). The video scaler 250 writes the video data to the $Y_c$, $U_c$, and $V_c$ FIFOs so as to convert the capture video data from the packed pixel format to a planer type format. For example, for an input capture video data stream consisting of "$Y_0U_0$, $Y_1V_0$, $Y_2U_2$, and $Y_3V_2 \ldots$", the video scaler 250 writes: $Y_0$, $Y_1$, $Y_2$ and $Y_3$ to the $Y_c$ FIFO 300; $U_o$ and $U_2$ to the $U_c$ FIFO 310; and $V_o$ and $V_2$ to the $V_c$ FIFO 310. The capture FIFOs 255 provides an efficient procedure for separating the capture video data into the composite YUV planer format. Because of the latency for access to the memory 168, separation of the packed pixel data into the planer format in real time (i.e. without the capture FIFOs 255) is inefficient. In a preferred embodiment, the video scaler 250 inputs the Y, U, and V capture video data into the capture FIFOs 255 at 60 frames per second.

In order to compress and decompress the video data, the image processing unit 170 contains a pixel processor (PB) 230. In a preferred embodiment, the PB 230 comprises an Intel ® 82750PB. The Intel ® 82750PB provides real time pixel manipulations, including compression of video data at 30 images per second. In addition, the 82750PB contains on-chip instruction RAM providing programmability for execution of a wide range of algorithms that support video decompression. For a complete description of the 82750PB see *i750, i860 and i960 Processors and Related Products*, published by Intel ® Corporation, 1993. In a preferred embodiment, the PB 230 operates in conjunction with an ISDN rate video. In order to comply with H.261 standards for video and audio framing, the PB 230 requires additional processing.

The turbo x 225 is coupled to PB 230 to provide internal mapping not available in the PB 230. In general, the turbo x 225 provides a map accelerator function for the PB 230 so as to generate compliant H.320 video compression. In a preferred embodiment, the turbo x 225 is implemented on a gate array. The in, age processing unit 170 also contains a PB interface 265 coupled to the PB 230 and turbo x 225. The PB interface 265 operates in conjunction with a PB FIFO 270. The PB interface 265 provides a 32 bit wide bus path to transfer video data to and from the memory 168. Specifically, the PB 230 generates read and write cycles to execute the compression and decompression algorithms. The PB FIFO 270 stores video data for processing by the PB 230. In general, the PB interface 265 requests video data from the memory 168, and stores the video data retrieved in the PB FIFO 270. As will be explained more fully below, the memory 168 contains a fixed amount of overhead for memory access. Once the memory overhead is resolved, retrieval of an incremental amount of data requires very short access times. Consequently, the PB interface 265 retrieves video data when memory bandwidth is available, thereby providing a queue for the PB 230. The PB FIFO 270 and the PB interface 265 provides a buffered system resulting in a readily accessible queue of video data for the PB 230.

The host interface 162 contains a host FIFO 275 and an ISA interface 280. In a preferred embodiment, the I/O bus 125 on the computer system 100 comprises an ISA compatible bus. In order to comply with the ISA bus standards, the ISA interface 280 generates bus cycles to conform to the ISA bus protocol. The host FIFO 275 stores input video data streams transferred over the I/O bus 125, and output video data streams buffered for transfer on the I/O bus 125. The size requirements for the host FIFO 275 is described more fully below. In accordance with the ISA bus specification, the ISA bus contains a maximum latency time. The maximum latency time defines the maximum amount of time for which an ISA bus master, upon dispatching a request to an ISA slave, waits for a response from the target ISA slave. In order to implement the video teleconferencing system of the present invention in a computer system utilizing the ISA bus, the maximum latency period for ISA bus specification is met.

As described above, the video teleconferencing subsystem 160 generates 24 bit RGB color definition pixel data for display on the output display 155. In order to convert the display video data in the video teleconferencing subsystem 160, the display unit 172 contains display FIFOs 290, a YUV-RGB converter 285, a DAC 240, and a display controller 295. The display FIFOs 290 buffer blocks of display video data, input from the memory 168, for subsequent display on the output display 155. The display controller 295 is coupled to the display FIFOs 290. In general, the display controller 295 is a slave controller controlled by the graphics display controller within the graphics subsystem 145. The display controller 295 contains registers for identifying portions of memory 168 that store the display video data. In operation, a memory management application program, resident in the main memory 110, programs memory addresses in the registers. The display controller 295 generates the memory addresses to access the video data stored in the memory 168.

The display controller 295 receives, as inputs, horizontal sync, vertical sync, and blanking signals from the graphics display controller. In turn, the display controller 295 transfers data from the display FIFOs 290 to the YUV-RGB converter 285 so as to provide display video data synchronous with the graphics display controller display rate. The YUV-RGB converter 285 converts the YUV data into a 24 bit RGB pixel format. The YUV-RGB converter 285 executes a mathematical transformation to convert the YUV display video data into the RGB domain. The 24 bit pixel data, generated by the YUV-RGB converter 285, is input to the DAC 240. The DAC 240 converts the 24 bit color definition pixel data to analog RGB signals compatible with the output display 155. The conversion of YUV pixel data to an analog RGB color definition is well known in the art and will not be described further.

FIG. 3 illustrates one embodiment for a high speed memory interface configured in accordance with the present invention. The high speed memory interface illustrated in FIG. 3 supports display and capture formats that typically require VRAM or a large amount of conventional DRAM. The capture FIFO 255, RAC 260, PB FIFO 270, Host FIFO 275, and display FIFOs 290 are coupled by a T bus 325. The capture FIFOs 255 contain $Y_c$ 300, $U_c$ 310, and $V_c$ 315. The FIFOs $Y_c$ 300, $U_c$ 310, and $V_c$ 315 are coupled to capture transfer logic 320. In general, the capture transfer logic 320 issues requests, at specific times, to gain access to the Rambus TM channel 297 via the RAC 260. In addition, the capture transfer logic 320 packetizes video data for transfer on the T bus 325. For purposes of explanation and nomenclature, the capture FIFOs 255 are serviced when the T bus logic 320 receives control of the Rambus TM channel 297. When the T bus logic 320 receives access of the Rambus TM channel 297, the capture transfer logic 320 transfers the data from FIFOs $Y_c$ 300, $U_c$ 310, and $V_c$ 315 to the RDRAM TM 220. Consequently, the capture FIFOs 255 are utilized to buffer incoming raw video data, input at an incoming pixel data rate, prior to transfer to the RDRAM TM 220.

The high speed memory interface illustrated in FIG. 3 includes the PB FIFO 270 and the host FIFO 275. The PB FIFO 270 contains a FIFO memory 354 and PB transfer logic 356. In general, the PB FIFO 270 pre-fetches video data to provide a readily available queue for the PB interface 265. The PB transfer logic 356 provides an interface for the PB FIFO 270 allowing access to the Rambus TM channel 297. The host FIFO 275 contains a FIFO memory 360 and host transfer logic 358. The FIFO memory 360 provides a buffer to interface the video teleconferencing subsystem 160 to the computer system 100, and the host transfer logic 358 provides an interface for the FIFO memory 360 allowing access to the Rambus TM channel 297.

The high speed memory interface also includes the display FIFOs 260. The display FIFOs 260 contain FIFOs $Y_d$ 364, $U_d$ 366, and $V_d$ 368. The FIFOs $Y_d$ 364, $U_d$ 366, and $V_d$ 368 are coupled to display transfer logic 362. The display transfer logic 362 provides an interface for the display FIFOs 290 allowing access to the Rambus TM channel 297. The display FIFOs 290 are serviced when the display transfer logic 362 receives control of the Rambus TM channel 297. When the display transfer logic 362 receives access of the Rambus TM channel 297, the display transfer logic 362 transfers display video data from the RDRAM TM 220 to the FIFOs $Y_d$ 364, $U_d$ 366, and $V_d$ 368. The display FIFOs 260 are utilized to buffer display video data prior to transfer to the YUV-RGB converter 285.

The RAC 260 is contained within the high speed memory interface illustrated in FIG. 3. The RAC 260 contains T bus arbiter 335, T bus controller 330 and Rambus TM interface 337. The RAC 260 may comprise an ASIC I/O cell or a custom cell obtained from Rambus TM, Inc., Mountain View, Calif. The Rambus TM interface 337 provides the low voltage level high speed circuitry for interface on the Rambus TM channel 297. The Rambus TM interface 337 also includes circuitry for supporting the logical layer compatible with the Rambus TM channel protocol. In general, the Rambus TM interface 337 receives data from a requesting FIFO, converts the data to the low swing voltage and generates the packets compatible with the Rambus TM channel protocol.

The T bus arbiter 335 performs a bus arbitration function to arbitrate requests from the capture FIFO 255, the PB FIFO 70, the host FIFO 275, and the display FIFO 290. In a preferred embodiment, the T bus arbiter 335 utilizes a static priority scheme for allocating use of the Rambus TM channel 297. The priority for each FIFO device for use in the static priority scheme is described more fully below. In order to access the RDRAM TM 220, such as from the display FIFOs 290, the display transfer logic 362 issues a request to the T bus arbiter 335. Upon receiving the request, the T bus arbiter 335 acknowledges to indicate either the Rambus TM channel 297 is busy or free. If the Rambus TM channel 297 is free, the display transfer logic 362 transfers data from the display FIFOs 290 to the Rambus TM interface 337. In response, the Rambus TM interface 337 provides the appropriate logical and physical layers to interface the data with the Rambus TM channel 297. The T bus 325, T bus controller 330, T bus arbiter 335, capture transfer logic 320, host transfer logic 358, PB transfer logic 356, and display transfer logic 362 may comprise any bus configuration, and are intended to represent a broad category of computer busses and associated hardware, which are well known in the art.

Figure 4:
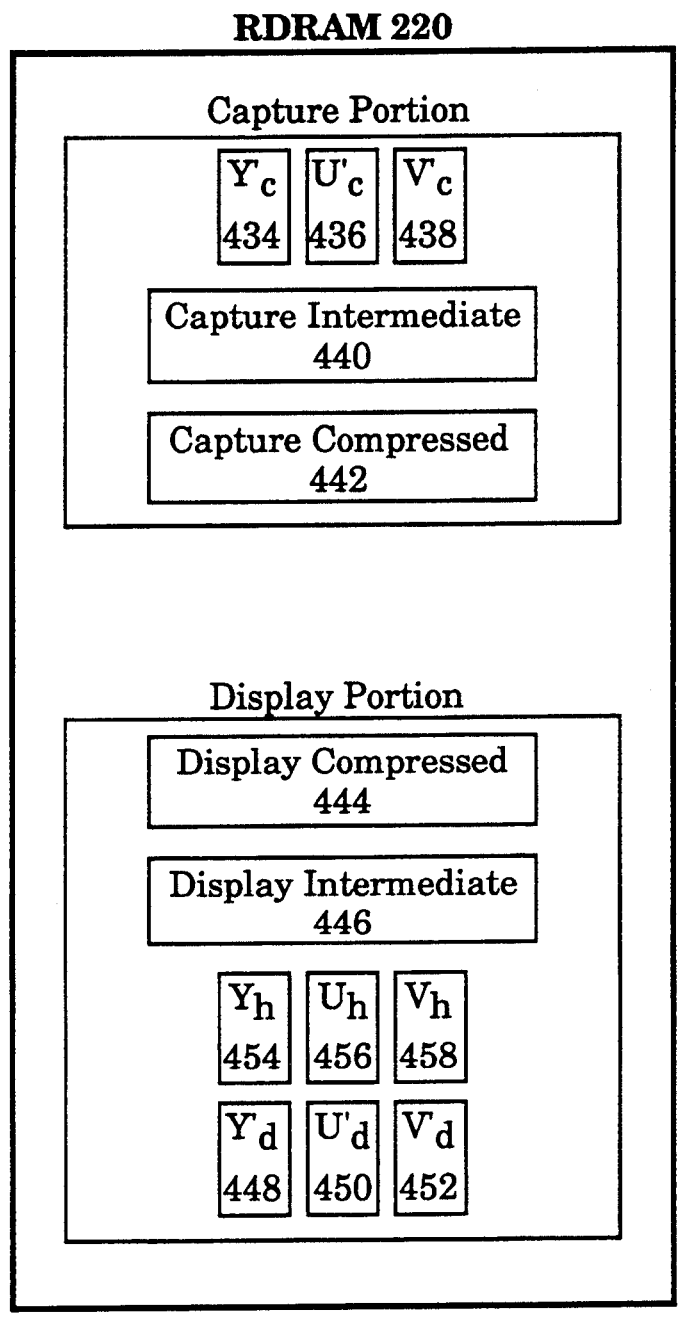
FIG. 4 illustrates one embodiment of the logical contents for the RDRAM TM utilized in the video teleconferencing system of the present invention.

FIG. 4 illustrates one embodiment of the logical contents for the RDRAM TM 220 utilized in the video teleconferencing system of the present invention. In general, the RDRAM TM 220 stores video data for the capture and display functions of tile video teleconferencing system. For the capture function, the RDRAM TM 220 stores bit maps $Y'_c$ 434, $U'_c$ 436, and $V'_c$ 438. The bit maps $Y'_c$ 434, $U'_c$ 436, and $V'_c$ 438 contain scaled or unscaled raw video data. The bit maps $Y'_c$ 434, $U'_c$ 436, and $V'_c$ 438 are read by the image processing unit 170. The image processing unit 170 utilizes a capture intermediate 440 and capture compressed 442. The capture intermediate 440 is generated by the image processing unit 170 for use in the compression algorithm. The capture data compressed by the image processing unit 170 is stored in the RDRAM TM 220 as capture compressed 442. In order to transfer video data to the remote source, the host interface 162 reads the compressed data, transfers the compressed data to the remote interface 140 via the I/O bus 125.

For the display function, the RDRAM TM 220 stores display compressed 444, display intermediate 446, and bit maps $Y'_d$ 448, $U'_d$ 450, and $V'_d$ 452. In addition, the RDRAM TM 220 stores bit maps $Y_h$ 454, $U_h$ 456, and $V_h$ 458. The bit maps $Y_h$ 454, $U_h$ 456, and $V_h$ 458 contain either all even frames or all odd frames of raw capture data. The host interface 162 receives the display compressed video data from the remote source, and transfers the display compressed video data to the RDRAM TM 220. The display compressed 444 is read by the image processing unit 170 to decompress the video data. The display intermediate 446 is generated by the image processing unit 170 for use in the decompression algorithm. The display video data decompressed by the image processing unit 170 is stored in the RDRAM TM 220 as bit maps $Y'_d$ 454, $U'_d$ 456, and $V'_d$ 458. The bit maps $Y'_d$ 454, $U'_d$ 456, and $V'_d$ 458 are read by the display unit 172 for subsequent display on the output display 155. The display unit 172 also reads the bit maps $Y_h$ 454, $U_h$ 456, and $V_h$ 458 for display on a second window on the output display 155.

The video teleconferencing subsystem 160 contains memory 168. In a preferred embodiment, the memory 168 comprises a Rambus TM dynamic random access memory (RDRAM TM) 220, and a Rambus TM ASIC cell (RAC) 260. The RAC 260 is coupled to the RDRAM TM 220 by a Rambus TM channel 297. In general, the memory 168 utilizes a high level protocol that transfers data in blocks. Specifically, the RDRAM TM 220 and RAC 260 transfer data at 500 MHz over the Rambus TM channel 297 to provide a high bandwidth memory system. The RDRAM TM 220 comprises a complementary metal oxide semiconductor (CMOS) DRAM incorporating Rambus TM interface circuitry. The Rambus TM interface circuitry interfaces the RDRAM TM to the Rambus TM channel 297. The RDRAM TM 220 is a slave device on the Rambus TM channel 297, thereby requiring a low level of intelligence for operation.

The Rambus TM channel 297 contains 9 data bits capable of transferring data at rates up to 500 megabytes per second from a single RDRAM TM. The 500 megabytes per second is a system level specification such that additional overhead for set-up time, hold tinge and buffering are incorporated into the specification. The Rambus TM channel 297 contains a well-defined mechanical interface such that the RDRAM TM 20 connects to a printed circuit board (PCB) with an interface containing only 15 active signals. The Rambus TM interface, located on the RDRAM TM 220, converts the low swing voltage levels utilized by the Rambus TM channel 297 to ordinary CMOS logic levels.

The Rambus TM channel 297 achieves high speed with dense packaging, high quality transmission lines, low voltage signaling and precise clocking. The physical packaging of the Rambus TM channel exhibits a number of electrical advantages. For example, the printed circuit board (PCB) traces are uniformly loaded, and the die pads are aligned with the PCB traces. As a result, the interface wires on the Rambus TM channel 297 are matched high quality transmission lines. The Rambus TM channel 297 contains 13 matched transmission lines including a clock to master line, a clock from master line, a 9 bit bus, and bus enable and bus control signals.

The signals on the Rambus ™ channel 297 utilize low voltage swings of approximately 600 millivolts (mV). The voltage swing is centered around a reference voltage, wherein proper setting of the voltage reference provides immunity from common mode noise on the Rambus ™ channel 297. The Rambus ™ channel 297 utilizes synchronous clocking such that all data transfers are referenced to clock edges. In a preferred embodiment, the clock resides in the RAG 260. In general, the RDRAM ™ 220 transmits data to the RAC 260 synchronously with the clock to master signal, and the RAC 260 transmits data to the RDRAM ™ 220 synchronously with the clock from master signal. Because the transmission lines are matched, clock and data signals remain synchronous throughout the transmission. The clock generates a 250 MHz signal, and data are transferred on both edges of the clock resulting in the 500 megabits per second data transfer rate.

The Rambus ™ channel 297 contains a protocol utilizing request, acknowledge and data packets. The transfer of a request, acknowledge and data packets constitute a transaction. The request is issued by the RAC 260 and contains a start bit, an op code, an address and a count. The op code specifies the data transfer as a read memory space, write memory space, read register space, write register space, and broadcast write register space. The address contains a 36 bit field specifying the first byte of the transfer operation. The count field contains an 8 bit field to permit transfer of 1 to 256 bytes of data. Upon receipt of a request packet from the RAC 260, the RDRAM ™ 220 responds with an acknowledge packet. The RDRAM ™ 220 acknowledge packet indicates the status for the RDRAM ™ 220 (i.e. ready, busy, an invalid address, or a reserved address space). Because the RDRAM ™ 220 is the only slave on the Rambus ™ channel 297, bus arbitration is not required.

The data packet contains 1 to 256 data bytes. After a request packet is issued by the RAC 260, an acknowledge packet is returned by the RDRAM ™ 220. If the acknowledge packet indicates the RDRAM ™ 220 is ready, then the read data packet is returned within a specified time after receipt of the request packet. The delay times defining the time delay between the request packet and the data packet are programmable during a system initialization. For a write transaction, the RAC 260 transmits the request packet, and the RDRAM ™ 220 responds within a specified time. If the acknowledge packet indicates the RDRAM ™ is ready, then the write data packet is transferred the specified time after receipt of the request packet.

Figure 5:
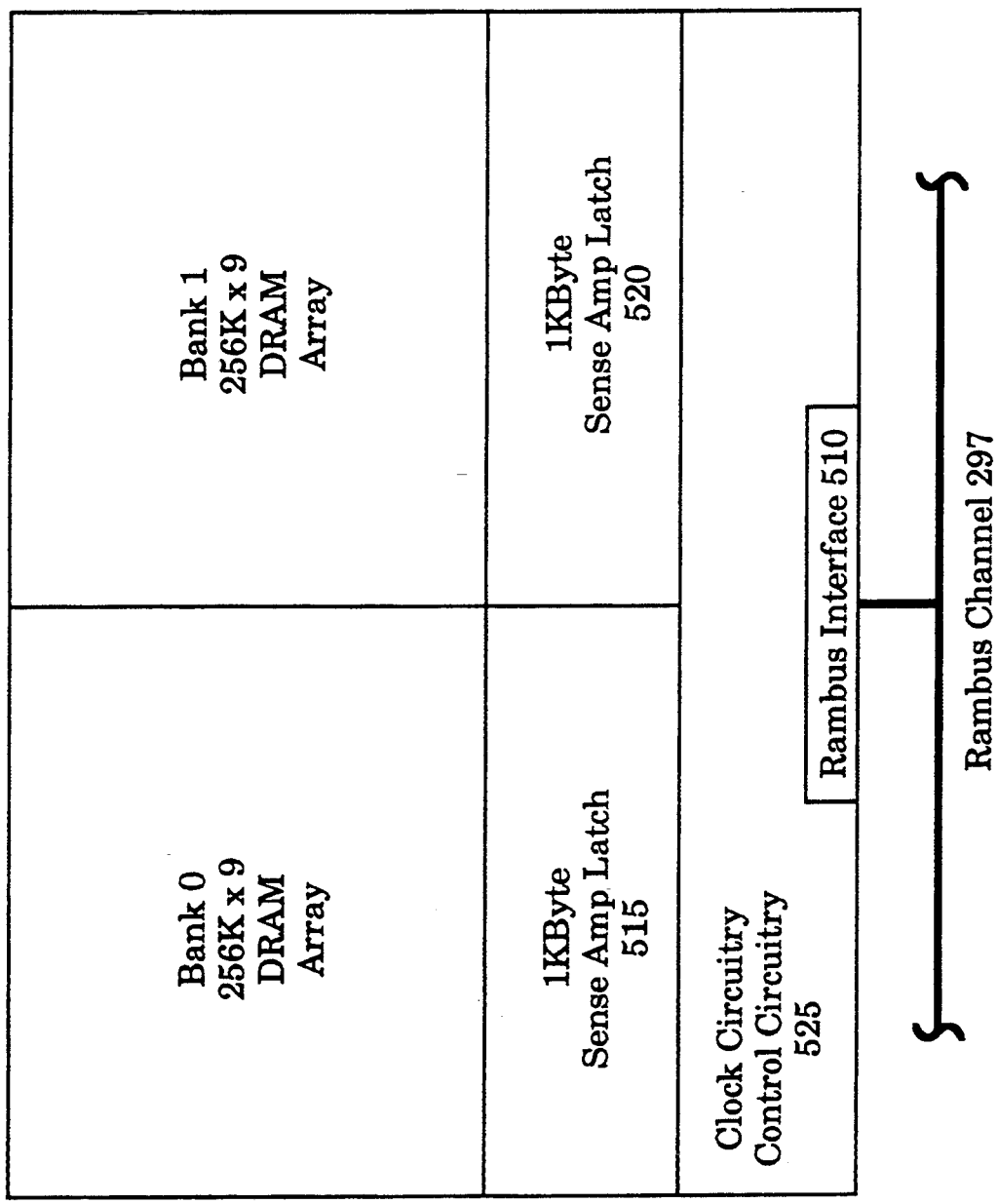
FIG. 5 illustrates a 4 megabit RDRAM TM configured in accordance with the present invention.

FIG. 5 illustrates a 4.5 megabit (Mbit) RDRAM ™. The RDRAM ™ 220 contains two memory banks, each arranged as 256K×9 bits. In addition to the DRAM arrays, the RDRAM ™ 220 contains two 1 Kbyte sense amp latches 515 and 520, control circuit 525, and a Rambus ™ interface 510. The sense amp latches 515 and 520 are utilized as a cache memory. Each of the 256K×9 DRAM arrays contains an active row, such that the active row is stored in the corresponding 1 Kbyte sense amp latch. When the RAC 260 accesses the active row for a corresponding memory bank, a cache hit occurs. Alternatively, if the RAC 260 requests access to a row that is not active, then a cache miss occurs. When access to the RDRAM ™ 220 results in a cache hit, the sense amp latches 515 and 520 are accessed at 500 megabytes per second across the Rambus ™ channel 297. When a cache miss occurs, the RDRAM ™ 220 issues a not ready code within the acknowledgment packet. The RDRAM ™ 220 fetches the required line, and stores the requested row data in the corresponding sense amp latch. The access time when a miss occurs corresponds to the RAS cycle time of a conventional page mode DRAM. If a miss occurs in one of the DRAM arrays, an access to the other DRAM array within the RDRAM ™ 220 is permissible.

As discussed above, the request packets issued by the RAC 260 specifies an initial starting address and a count. The control circuit 525 decodes the address in the request packet, and if the address is valid, an acknowledge packet is transmitted to the RAC 260. If the row requested resides in the sense amp latch 515 or 520, then the control circuitry 525 issues an acknowledgment packet containing an "OK" opcode. Otherwise, the control circuitry 525 returns a "NACK" opcode with the acknowledgment packet to indicate that the RAC 260 should retry the request. The RDRAM ™ 220 contains a built-in refresh capability. If a refresh cycle is in progress when the RAC 260 initiates a request, then the RDRAM ™ 220 responds with a NACK across the BUSCTRL line. The NACK acknowledgment indicates that the RDRAM ™ 220 is busy, and the RAC 260 must reissue the request packet.

The Rambus ™ interface 510 converts on-chip CMOS levels to the low voltage swing utilized by the Rambus ™ channel 297. In addition, the Rambus ™ interface 510 incorporates logic that implements the acknowledge protocol, decodes the request packets, and multiplexes one of the sense amp latches 515 or 520 onto the Rambus ™ channel 297. The sense amp latch accessed is determined by a bit field in the address of the request packet. The Rambus ™ interface 510 utilizes phase lock loops to synchronize on-chip and off-chip clocks and data, thereby insuring synchronous operation of the bus. The control circuitry 525 also contains the registers utilized to initialize the RDRAM ™ 220 to specify various operating modes. For example, the registers are used to specify device type, size, coding, manufacturer's identification, control of DRAM refresh, control of request and acknowledge transaction timing, mode control, current control and address mapping. For a further explanation of the RDRAM ™ 220, see Rambus ™ Architectural Overview, Rambus, Inc., Mountain View, Calif.

The VESA standard for 1024×768 output displays requires a 75 MHz data rate (e.g. 70 Hz vertical refresh for the output display 155). In a preferred embodiment of the present invention, the display FIFOs 290 supports the 75 MHz data rate without buffering a full scan line of display video data in the display FIFOs 290. Although no restrictions on the maximum width of the video image are imposed, peak bandwidth requirements and maximum latency periods for the display FIFOs 290 are required to support the 75 MHz data rate. For example, if the display video data format comprises YUV 16, then YUV 16 data are read from the RDRAM ™ 220, and converted into the 24 bit RGB color definition pixel data within the 75 MHz data rate. In order to sustain the 70 Hz vertical refresh for the output display 155, a service data rate for the display FIFOs 290 of greater than 150 megabytes per second is required. The display FIFOs 290 include the $Y_d$ FIFO 364, $U_d$ FIFO 366, and $V_d$ FIFO 368, and the average bandwidth of all $Y_d$, $U_d$, and $V_d$ FIFOs must be greater than 150 Mbytes per second.

In addition to the display data transfer rate, the display FIFOs 290 contain a FIFO depth sufficient to support the maximum latency between data requests for the YUV-RGB converter 285 and service from the memory 168. In addition, the FIFO depth for the display FIFOs 290 is sufficient to receive long burst reads from the memory 168 necessary for high bandwidth. Because the display FIFOs 290 require the highest bandwidth and require the largest number of FIFO entries, the display FIFOs 290 contain the highest priority requestor to the Rambus ™ channel 297. Table 1 contains a list of the FIFOs utilized in the video teleconferencing subsystem 160. For each FIFO, Table 1 contains a corresponding static priority, FIFO depth, burst length, transfer time, required bandwidth, and maximum latency. For example, the $Y_d$ FIFO 364 contains a FIFO depth of 136 bytes with a burst length of 128 bytes. The FIFO depth of 136 bytes for the $Y_d$ FIFO 364 provides for 332 nano seconds (ns) of latency. In order to support the maximum latency requirement and sustain the refresh data rate, 263 Mbytes per second of memory bandwidth is allocated.

FIFOs 255 do not require service at the same time. At an incoming pixel data rate of approximately 12.27 MHz (unsealed NTSC square pixels), the request for service rate for the capture FIFOs 255 is about 5.2 micro seconds with each capture FIFO being serviced at about 1.7 micro seconds.

In order to implement the video teleconferencing subsystem of the present invention in a computer system containing an ISA bus, access to the memory 168 within the maximum latency time period specified by the ISA bus specification is required. During any 1.7 micro second period, the $Y_d$ FIFO 364, $U_d$ FIFO 366, and $V_d$ FIFO 368 are serviced once, and only one of the capture FIFOs 255 is serviced. During the 1.7 micro second period, the time required to service the display FIFOs 290 totals 1.2 micro seconds, the time required to service the longest capture FIFO, $Y_c$ FIFO 300, is 290 nano seconds, and the time required to execute a single refresh event is 184 nano seconds. Consequently, the total of these times constitutes the maximum latency for the pending ISA bus cycle, 1.675 nano seconds.

The video teleconferencing system of the present invention requires that a minimum amount of memory bandwidth is available for the PB FIFO 270 and the

TABLE 1

| Unit | Priority | FIFO Depth | Burst Length | Transfer Time | Bandwidth | Maximum Latency |
|---|---|---|---|---|---|---|
| Display Y | 1 | 136 | 128 | 485 nS | 263 MB/S | 332 nS |
| Display U | 1 | 72 | 64 | 358 nS | 178 MB/S | 310 nS |
| Display V | 1 | 72 | 64 | 358 nS | 178 MB/S | 310 nS |
| Refresh | 2 | | | 184 nS | | |
| Capture Y | 3 | 88 | 64 | 290 nS | 220 MB/S | 2036 nS |
| Capture U | 3 | 48 | 32 | 226 nS | 141 MB/S | 2607 NS |
| Capture V | 3 | 48 | 32 | 226 nS | 141 MB/S | 2607 nS |
| Host | 4 | 8 | 8 | 246 nS | 32 MB/S | 1676 nS |
| PB | 5 | 8 | 8 | 246 nS | 32 MB/S | |

In order to support the 70 Hz vertical refresh data rate for the output display 155, data are transferred to the display FIFOs 290 in turn, and evenly distributed over a period of 128 pixels. In the case of a 75 MHz vertical refresh rate, the display FIFOs 290 request data every 1706 ns, separated by 568 ns. By evenly spacing the display FIFO requests, the requirement to handle the latency resulting if all three requested service simultaneously is removed. The maximum latency that any of the display FIFOs 290 receive is the longest transfer time of a lower priority FIFO or memory refresh. For the bandwidth allocation example illustrated in Table 1, the maximum latency that a lower priority FIFO exhibits is 290 ns of latency.

As shown in Table 1, the capture FIFOs $Y_c$ 300, $U_c$ 310, and $V_c$ 315 contain a FIFO depth of 88, 48, and 48 bytes, respectively. The depth of the capture FIFOs 255 are sufficient to support long burst rates to memory, and support the maximum latency period for each capture FIFO (i.e. the combined transfer rates of higher priority devices). The FIFO depths of the capture FIFOs 255 permit processing of unscaled raw video data without regard to the maximum length of the incoming scan line. As shown in Table 1, the maximum latency for any one of the capture FIFOs 255 is 1632 nano seconds (i.e. the sum of bursts for all the display FIFOs 290, a refresh to the RDRAM ™ 220, and an in-process host 75 or PB FIFO 270 access). Similar to the display FIFOs 290, the capture FIFOs 255 request service from the memory 168 at evenly spaced intervals over a specified period of time. A burst length of 64 capture pixels for the $U_c$ FIFO 310 and $V_c$ FIFO 315 insures that the capture host FIFO 275. Because the host FIFO 275 contains a higher priority for the Rambus ™ channel 197 than the PB FIFO 270, and generates bus cycles faster than 1.6 micro seconds, the host FIFO 275 can effectively lock the PB FIFO 270 from accessing the memory 168 for an indeterminate amount of time. However, the remaining bandwidth to the memory 168 after display, refresh, and capture is available for the host and PB to share.

Table 2 illustrates the amount of memory bandwidth required by the display unit 172 to support a number of video teleconferencing applications. For each application, the number of windows, size of the windows, the type of data transferred to the display FIFOs 290, the amount of memory required, the display rate, and memory bandwidth consumed is shown. For the number of windows displayed, one display window is generated to display the remote source video data, and a second display window is generated to display the host video data. The type of data transferred from the memory 168 is dependent upon the size of the window. As shown in Table 2, in order to display two windows comprising 352×288 pixels of YUV 16 data at 70 Hz, 405 Kbytes of memory are required, and 13.3% of the memory bandwidth is consumed.

TABLE 2

| Number of Windows | Size | Type | Memory Required | Display Rate | Bandwidth Consumed |
|---|---|---|---|---|---|
| 2 | 352 × 288 | YUV16 | 405 KB | 70 Hz | 13.3% |
| 2 | 320 × 240 | YUV16 | 307 KB | 70 Hz | 10.0% |

TABLE 2-continued

| Number of Windows | Size | Type | Memory Required | Display Rate | Bandwidth Consumed |
|---|---|---|---|---|---|
| 2 | 352 × 288 | YUV12 | 304 KB | 70 Hz | 9.3% |
| 2 | 176 × 144 | YUV16 | 101 KB | 70 Hz | 3.3% |
| 2 | 176 × 144 | YUV12 | 76 KB | 70 Hz | 2.3% |
| 2 | 160 × 120 | YUV9 | 43 KB | 70 Hz | 1.9% |

Table 3 illustrates the amount of memory bandwidth required by the capture unit 166 to support a number of video teleconferencing applications. For each application, the number of windows, size of the windows, the type of data captured in the capture FIFOs 255, the amount of memory required, the capture rate, and memory bandwidth consumed is shown. For example, in order to capture two windows comprising 160×120 pixels of YUV 9 data at 30 Hz, 43 Kbytes of memory are required, and less than 1% of the memory bandwidth is consumed.

TABLE 3

| Number of Windows | Size | Type | Memory Required | Capture Rate | Bandwidth Consumed |
|---|---|---|---|---|---|
| 2 | 352 × 288 | YUV16 | 405 KB | 30 Hz | 5.7% |
| 2 | 352 × 288 | YUV12 | 304 KB | 30 Hz | 4.0% |
| 2 | 176 × 144 | YUV16 | 101 KB | 30 Hz | 1.4% |
| 2 | 176 × 144 | YUV12 | 76 KB | 30 Hz | 1.0% |
| 2 | 160 × 120 | YUV9 | 43 KB | 30 Hz | <1% |

Figure 6:
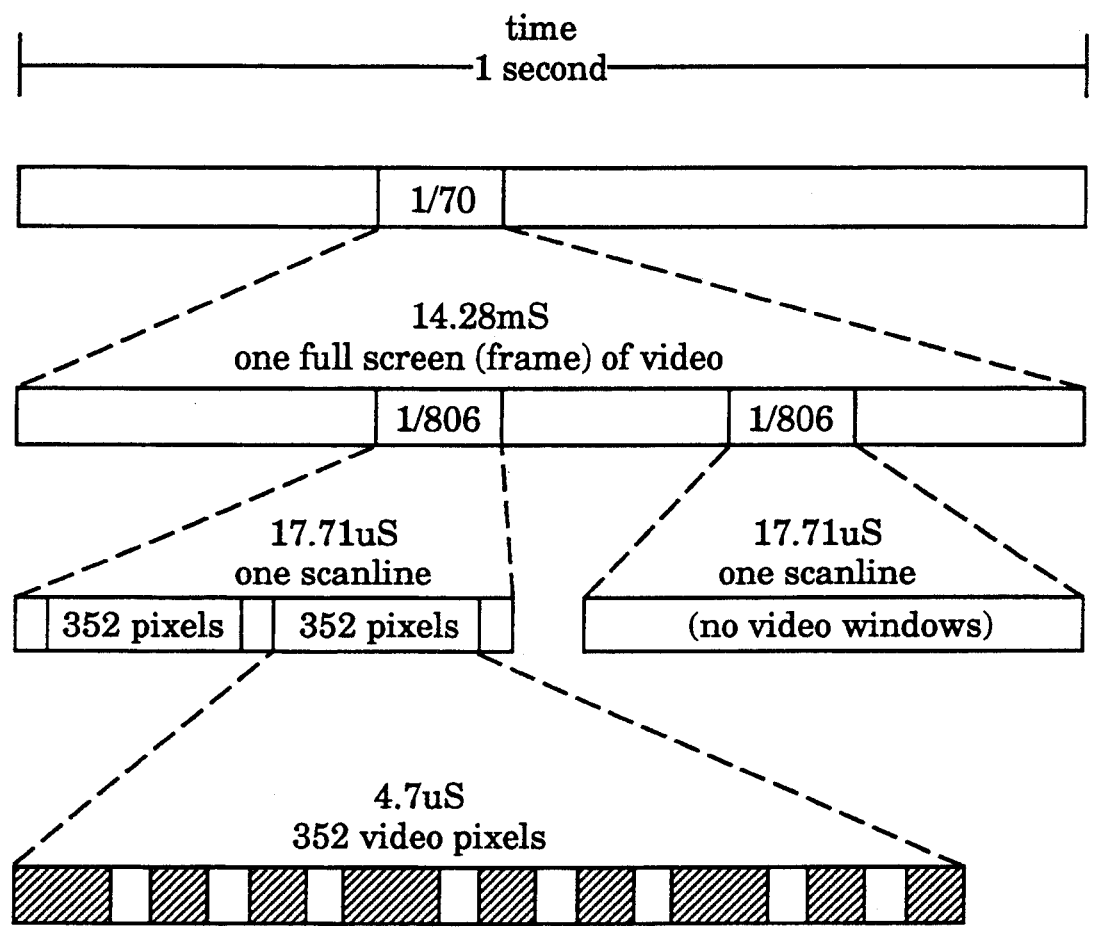
FIG. 6 illustrates the amount of the Rambus TM channel bandwidth consumed for the display function of the present invention.

FIG. 6 illustrates the amount of the Rambus TM channel 197 bandwidth consumed for the display function. For the example illustrated in FIG. 6, the vertical refresh rate is 70 Hz. In a period of one second, the display rate is 1/70 or 14.28 milliseconds (ms). Within the 14.28 ms period, one full frame of video, comprising of two fields, is transferred to the chroma key circuit 150. For each frame of video, one scan line is displayed in 17.71 micro seconds (us). For the example shown in FIG. 6, one scan line contains 352 pixels per field. Consequently, within a 4.7 micro second period, the 352 video pixels are displayed. For the 4.7 us period, the shaded portion of FIG. 6 illustrates the amount of the Rambus TM channel bandwidth allocated for the display function, and the unshaded portion illustrates the amount of Rambus TM channel bandwidth available to service other devices.

The high speed memory interface of the present invention provides for an efficient video teleconferencing system. The high speed memory interface of the present invention exhibits high bandwidth. Peak transfer rates are 500 megabytes per second, and realistic aggressive data rates are on the order of 110 megabytes per second. As shown above, this high bandwidth is adequate for supporting large displays and unscaled capture data. In addition, the high bandwidth of the high speed memory interface of the present invention permits use of smaller FIFOs in the support circuitry. Consequently, smaller FIFOs result in integrated gate array technology that is easy to implement. In addition, the high speed RDRAM TM 220 comprises a 512 Kbyte incremental memory size. The incremental memory size allows for flexibility in the amount of memory used in a particular system. The high speed memory interface of the present invention results in the ability to support display configurations in capture formats that would otherwise be impossible without the use of VRAM or excessively large amounts of DRAM. Consequently, the amount of memory used for video teleconferencing is reduced.

Although the present invention has been described in terms of specific exemplary embodiments, it will be appreciated that various modifications and alterations might be made by those skilled in the art without departing from the spirit and scope of the invention as set forth in the following claims.

What is claimed is:

1. An apparatus for interfacing a high speed memory for video teleconferencing between a host and at least one a remote source, said apparatus comprising:

a high speed channel interface including an arbiter, coupled to said high speed memory, for allocating bandwidth for said high speed memory for display service, capture service, host service and refresh service;

a capture FIFO, including capture transfer logic, coupled to said high speed channel interface, for receiving raw capture video data, and for buffering said raw capture video data at a capture rate, and for transferring said raw capture video data from said capture FIFO to said high speed memory during said capture service;

a host FIFO, including host transfer logic, coupled to said high speed channel interface, for receiving input display video data from said at least one remote source, for buffering said input display video data, and said host transfer logic for transferring said input display video data from said host FIFO, during said host service, to said high speed memory, and for transferring, from said high speed memory, capture video data, during said host service, to said host FIFO; and a display FIFO, including display transfer logic, coupled to said high speed channel interface, for transferring display video data, during said display service, from said high speed memory to said display FIFO, and for buffering said display video data to provide said display video data at a display rate for said host.

2. The apparatus for interfacing a high speed memory for video teleconferencing as set forth in claim 1, wherein said high speed memory delivers, and said high speed channel interface transfers data up to 500 Megabytes per second.

3. The apparatus for interfacing a high speed memory for video teleconferencing as set forth in claim 1, wherein:

said bus arbiter being capable of allocating bandwidth of said high speed memory for PB service; and a pixel processing interface, including a PB FIFO and PB transfer logic, coupled to said high speed channel interface, for transferring said capture video data, during said PB service, from said high speed memory to said PB FIFO to provide an input queue for video compression, said PB transfer logic being capable of transferring said display video data, during said PB service, from said high speed memory to said PB FIFO to provide an input queue for video decompression.

4. The apparatus for interfacing a high speed memory for video teleconferencing as set forth in claim 3, wherein said arbiter comprises a static priority arbiter for assigning a first priority to said display service, a second priority for said refresh service, a third priority to said capture service, a fourth priority to said host service, and a fifth priority to said PB service.

5. The apparatus for interfacing a high speed memory for video teleconferencing as set forth in claim 1, wherein said host FIFO comprises an ISA bus interface to interface said host FIFO to an ISA bus, said host FIFO comprising a size capable of supporting a maximum latency requirement for said ISA bus.

6. The apparatus for interfacing a high speed memory for video teleconferencing as set forth in claim 1, wherein said display transfer logic comprises capture video display logic for transferring raw capture video data, during said display service, from said high speed memory to said display FIFO, to provide said raw capture video data at a capture display rate for said host.

7. The apparatus for interfacing a high speed memory for video teleconferencing as set forth in claim 1, wherein said capture rate comprises 60 Hz per field, and said display rate comprises a vertical refresh rate of 70 Hz.

8. The apparatus for interfacing a high speed memory for video teleconferencing as set forth in claim 1, wherein:
said raw capture video data comprises CCIR 601 (YUV 16) video data;
said capture FIFO comprises:
a Y FIFO for buffering said Y capture video data;
a U FIFO for buffering said U capture video data; and
a V FIFO for buffering said V capture video data;
said display video data comprises YUV 16 display video data; and
said display FIFO comprises:
a Y display FIFO for buffering said Y display video data;
a U display FIFO for buffering said display video data; and
a V display FIFO for buffering said V display video data.

9. The apparatus for interfacing a high speed memory for video teleconferencing as set forth in claim 8, wherein said arbiter comprises a mechanism for allocating bandwidth for said high speed memory for display service in evenly spaced intervals for said Y display FIFO, U display FIFO, and V display FIFO, and said arbiter comprises a mechanism for allocating bandwidth for said high speed memory for capture service in evenly spaced intervals for said Y capture FIFO, U capture FIFO, and V capture FIFO.

10. An apparatus for interfacing a high speed memory for video teleconferencing between a host and at least one a remote source, said apparatus comprising:
high speed memory interface means, coupled to said high speed memory, including arbitration means for allocating bandwidth for said high speed memory for display service, capture service, host service and refresh service;
capture means, coupled to said high speed memory interface means, for capturing video data for receiving raw capture video data, said capture means including capture buffer means for buffering said raw capture video data at a capture rate, and for transferring said raw capture video data from said capture buffer means to said high speed memory during said capture service;
host interface means including host buffer means, coupled to said high speed memory interface means, for receiving input display video data from said at least one remote source, for buffering said input display video data in said host buffer means, and for transferring said input display video data from said host buffer means, during said host service, to said high speed memory, and for transferring, from said high speed memory, capture video data, during said host service, to said host buffer means; and
display means coupled to said high speed memory interface means for transferring display video data, during said display service, from said high speed memory to a display buffer, and said display means including display buffer means for buffering said display video data to provide said display video data at a display rate for said host.

11. The apparatus for interfacing a high speed memory for video teleconferencing as set forth in claim 10, wherein said high speed memory comprises a RDRAM TM, and said high speed memory interface means comprises a Rambus TM channel interface.

12. The apparatus for interfacing a high speed memory for video teleconferencing as set forth in claim 10, wherein:
said arbitration means is capable of allocating bandwidth of said high speed memory for PB service; and
pixel processing interface means, including PB buffer means, coupled to said bus arbitration means, for interfacing a pixel processing unit to said high speed memory, said pixel processing interface means being capable of transferring said capture video data, during said PB service, from said high speed memory to said PB buffer means to provide an input queue for video compression, said pixel processing interface means capable of transferring said display video data, during said PB service, from said high speed memory to said PB buffer means to provide an input queue for video decompression.

13. The apparatus for interfacing a high speed memory for video teleconferencing as set forth in claim 12, wherein said arbitration means comprises static priority means for allocating said high speed memory bandwidth by assigning a first priority to said display service, a second priority for said refresh service, a third priority to said capture service, a fourth priority to said host service, and a fifth priority to said PB service.

14. The apparatus for interfacing a high speed memory for video teleconferencing as set forth in claim 10, wherein said host interface means comprises an ISA interface means for interfacing said host interface means to an ISA bus, said ISA interface means being capable of supporting a maximum latency requirement for said ISA bus.

15. The apparatus for interfacing a high speed memory for video teleconferencing as set forth in claim 10, wherein said display means comprises capture video data display means for transferring raw capture video data, during said display service, from said high speed memory to said display buffer, and said display buffer means for buffering said raw capture video data to provide said raw capture video data at a display rate for said host.

16. The apparatus for interfacing a high speed memory for video teleconferencing as set forth in claim 10, wherein said capture rate comprises 60 Hz per field, and said display rate comprises a vertical refresh rate of 70 Hz.

17. The apparatus for interfacing a high speed memory for video teleconferencing as set forth in claim 10, wherein:

said raw capture video data comprises CCIR 601 (YUV 16) video data;

said capture buffer means comprises:

Y capture buffer means for storing said Y capture video data;

U capture buffer means for storing said U capture video data; and

V capture buffer means for storing said V capture video data;

said display video data comprises YUV 16 display video data; and said display buffer means comprises:

Y display buffer means for storing said Y display video data;

U display buffer means for storing said U display video data; and

V display buffer means for storing said V display video data.

18. The apparatus for interfacing a high speed memory for video teleconferencing as set forth in claim 17, wherein said arbitration means is capable of allocating bandwidth for said high speed memory for display service in evenly spaced intervals for said Y display buffer means, U display buffer means, and V display buffer means, and said arbitration means is capable of allocating bandwidth for said high speed memory for capture service in evenly spaced intervals for said Y capture buffer means, U capture buffer means, and V capture buffer means.

19. A method for interfacing a high speed memory for video teleconferencing between a host and at least one a remote source, said method comprising the steps of:

allocating bandwidth for said high speed memory for display service, capture service, host service and refresh service;

receiving input display video data from said at least one remote source;

buffering said input display video data in a host buffer;

transferring said input display video data from said host buffer, during said host service, to said high speed memory;

receiving raw capture video data from a video source;

buffering said raw capture video data in a capture buffer at a capture rate;

transferring said raw capture video data from said capture buffer to said high speed memory during said capture service;

transferring, from said high speed memory, capture video data, during said host service, to said host buffer for buffering in said host buffer;

transferring display video data, during said display service, from said high speed memory to a display buffer; and buffering said display video data in said display buffer so as to provide said display video data at a display rate for said host.

20. The method for interfacing a high speed memory for video teleconferencing as set forth in claim 19, wherein said high speed memory delivers, and said high speed channel interface transfers data up to 500 Megabytes per second.

21. The method for interfacing a high speed memory for video teleconferencing as set forth in claim 19, further comprising the steps of:

allocating bandwidth of said high speed memory for PB service;

transferring said capture video data, during said PB service, from said high speed memory to a PB buffer;

buffering, in said PB buffer, said capture video data to provide an input queue for video compression;

transferring said display video data, during said PB service, from said high speed memory to a PB buffer; and buffering, in said PB buffer, said display video data to provide an input queue for video decompression.

22. The method for interfacing a high speed memory for video teleconferencing as set forth in claim 21, wherein the step of allocating bandwidth for said high speed memory comprises the steps of:

assigning a first priority to said display service;

assigning a second priority for said refresh service;

assigning a third priority to said capture service;

assigning a fourth priority to said host service; and assigning a fifth priority to said PB service.

23. The method for interfacing a high speed memory for video teleconferencing as set forth in claim 19, wherein said step of buffering said display video data and said capture video data in said host buffer supports a maximum latency requirement for said industry standard (ISA) bus.

24. The method for interfacing a high speed memory for video teleconferencing as set forth in claim 19, further comprising the steps of:

transferring raw capture video data, during said display service, from said high speed memory to said display buffer; and buffering said raw capture video data in said display buffer so as to provide said raw capture video data at a display rate for said host.

25. The method for interfacing a high speed memory for video teleconferencing as set forth in claim 19, wherein:

the step of buffering said raw capture video comprises the step of buffering said raw capture video at a capture rate of 60 Hz per field; and the step of buffering said display video data comprises the step of buffering said display video data at a vertical refresh rate of 70 Hz.

26. The method for interfacing a high speed memory for video teleconferencing as set forth in claim 19, wherein:

the step of receiving raw capture video data comprises the step of receiving CCIR 601 (YUV 16) video data;

the step of buffering said raw capture video data comprises the steps of:

storing said Y capture video data in a Y capture first-in first-out (FIFO) memory;

storing said U capture video data in a U capture FIFO memory; and storing said V capture video data in a Y capture FIFO memory;

the step of transferring display video data comprises the step of transferring YUV 16 display video data; and the step of buffering said display video data in said display buffer comprises the steps of:

storing said Y display video data in a Y display FIFO memory;
storing said U display video data in a U display FIFO memory; and
storing said V display video data in a Y display FIFO memory.

27. The method for interfacing a high speed memory for video teleconferencing as set forth in claim 26, wherein:
the step of allocating bandwidth for said high speed memory for display service comprises the step of servicing said Y display FIFO, U display FIFO, and V display FIFO in evenly spaced intervals; and
the step of allocating bandwidth for said high speed memory for capture service comprises the step of servicing said Y capture FIFO, U capture FIFO, and V capture FIFO in evenly spaced intervals.

28. A computer system comprising:
a central processing unit (CPU);
memory coupled to said CPU;
a bus coupled to said CPU;
an output display, coupled to said bus, for displaying graphics and video;
a remote interface coupled to said bus, for interfacing said computer system to at least one remote source;
a graphics subsystem, coupled to said bus, for generating graphics, including an encoded key, for display on said output display;
a video teleconferencing subsystem, coupled to said bus for teleconferencing between said computer system and said at least one remote source, said video teleconferencing subsystem comprising:
a host interface coupled to said bus to interface said video teleconferencing subsystem;
a capture unit for capturing video data in said computer system;
a display unit for generating display video data for display on said output display;
an image processing unit for compressing and decompressing video data;
a high speed memory for storing capture video data and display video data;
a high speed memory interface, coupling said capture unit, said image processing unit, and said display unit to said high speed memory; and
a chroma key circuit, coupling said graphics subsystem and said video teleconferencing subsystem to said output display, for coupling said video to said output display when said chroma keying circuit detects said encoded key in said graphics, and for coupling said graphics to said output display when said chroma keying circuit does not detect said encoded key in said graphics.

29. The computer system as set forth in claim 28, wherein said high speed memory interface comprises:
a high speed channel interface including an arbiter, coupled to said high speed memory, for allocating bandwidth for said high speed memory for display service, capture service, host service, refresh service and PB service;
a capture FIFO, including capture transfer logic, coupled to said high speed channel interface and said capture unit, for receiving raw capture video data, and for buffering said raw capture video data at a capture rate, and said capture transfer logic transferring said raw capture video data from said capture FIFO to said high speed memory during said capture service;
a host FIFO, including host transfer logic, coupled to said high speed channel interface and said host interface unit, for receiving input display video data via said bus, for buffering said input display video data, and said host transfer logic being capable of transferring said input display video data from said host FIFO, during said host service, to said high speed memory, and for transferring, from said high speed memory, capture video data, during said host service, to said host FIFO;
a display FIFO, including display transfer logic, coupled to said high speed channel interface and said display unit, for transferring display video data, during said display service, from said high speed memory to said display FIFO, and for buffering said display video data to provide said display video data at a display rate for said host; and
a pixel processing interface, including a PB FIFO and PB transfer logic, coupled to said high speed channel interface and said image processing unit, for transferring said capture video data, during said PB service, from said high speed memory to said PB FIFO to provide an input queue for video compression, for transferring said display video data, during said PB service, from said high speed memory to said PB FIFO to provide an input queue for video decompression.

30. The computer system as set forth in claim 29, wherein said high speed memory delivers, and said high speed channel interface transfers data up to 500 Megabytes per second.

31. The computer system as set forth in claim 29, wherein said arbiter comprises a static priority arbiter for assigning a first priority to said display service, a second priority for said refresh service, a third priority to said capture service, a fourth priority to said host service, and a fifth priority to said PB service.

32. The computer system as set forth in claim 29, wherein:
said bus comprises an ISA bus; and
said host FIFO comprises an ISA bus interface for interfacing said host FIFO to said ISA bus, said host FIFO comprising a sufficient number of entries to support a maximum latency requirement for said ISA bus.

33. The computer system as set forth in claim 29, wherein said display transfer logic comprises capture video display logic for transferring raw capture video data, during said display service, from said high speed memory to said display FIFO to provide said raw capture video data at a capture display rate for display on said output display.

34. The computer system as set forth in claim 29, wherein said capture rate comprises 60 Hz per field, and said display rate comprises a vertical refresh rate of 70 Hz.

35. The computer system as set forth in claim 29, wherein:
said raw capture video data comprises CCIR 601 (YUV 16) video data;
said capture FIFO comprises:
a Y FIFO for buffering said Y capture video data;
a U FIFO for buffering said U capture video data; and
a V FIFO for buffering said V capture video data;

said display video data comprises YUV 16 display video data; and said display FIFO comprises:
- a Y display FIFO for buffering said display video data;
- a U display FIFO for buffering said U display video data; and
- a V display FIFO for buffering said V display video data.

36. The computer system as set forth in claim 29, wherein said arbiter is capable of allocating bandwidth for said high speed memory, during display service, in evenly spaced intervals for said Y display FIFO, U display FIFO, and V display FIFO, and said arbiter is capable of allocating bandwidth for said high speed memory for capture service in evenly spaced intervals for said Y capture FIFO, U capture FIFO, and V capture FIFO.

* * * * *

UNITED STATES PATENT AND TRADEMARK OFFICE
CERTIFICATE OF CORRECTION

PATENT NO. : 5,369,617
DATED : November 29, 1994
INVENTOR(S) : Bill A. Munson It is certified that error appears in the above-identified patent and that said Letters Patent is hereby corrected as shown below:

In column 7 at line 22 delete "in, age" and insert --image--

In column 10 at line 50 delete "tinge" and insert --time--

In column 11 at line 12 delete "RAG 260." and insert --RAC 260.--

In column 17 at line 36 insert --U-- following "said" and prior to "display"

In column 23 at line 4 insert --Y-- following "said" and prior to "display"

Signed and Sealed this

Eleventh Day of February, 1997

Attest:

BRUCE LEHMAN

*Attesting Officer*   *Commissioner of Patents and Trademarks*